March 10, 1964     F. L. McEWEN     3,123,965
LIQUID LUBRICANT APPLYING DEVICE FOR A TREE SHAKER GRAPPLE UNIT
Filed Aug. 6, 1962     2 Sheets-Sheet 1
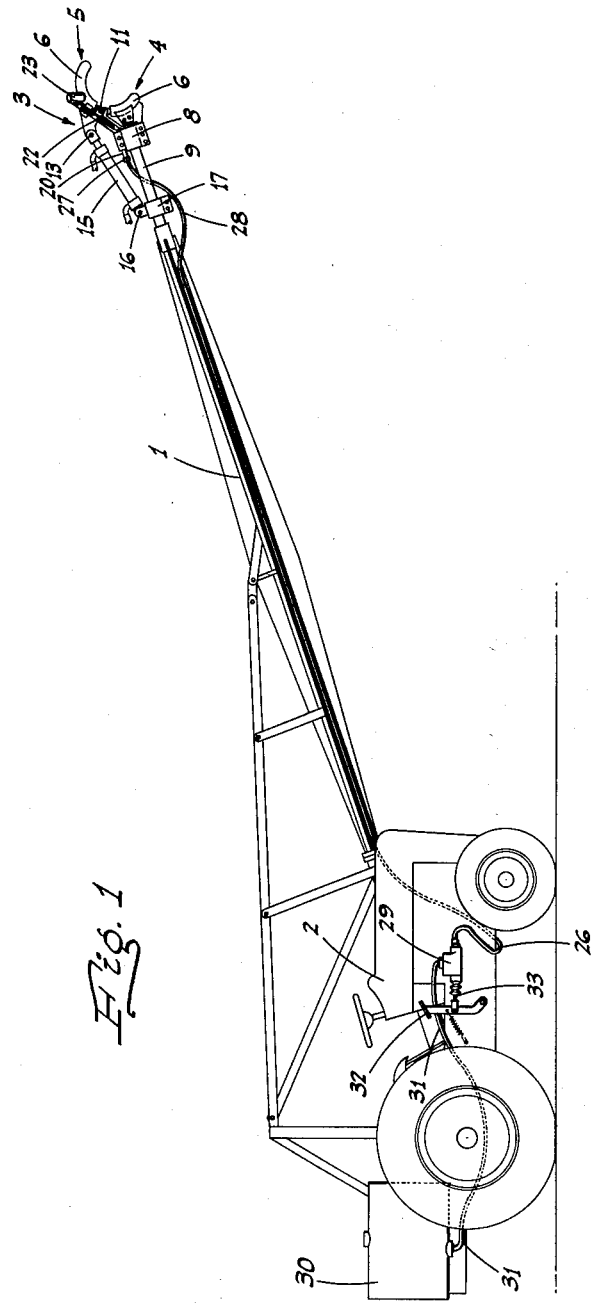
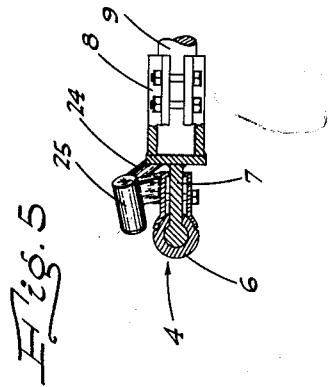
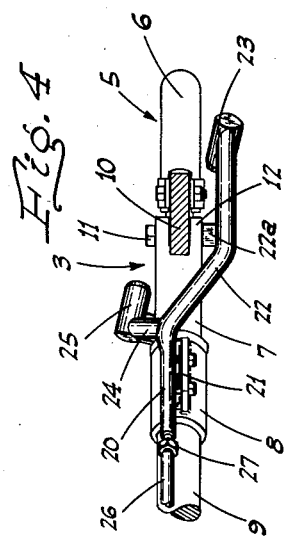
INVENTOR.
Frederick L. McEwen
BY
Webster & Webster
ATTYS.

March 10, 1964     F. L. McEWEN     3,123,965
LIQUID LUBRICANT APPLYING DEVICE FOR A TREE SHAKER GRAPPLE UNIT
Filed Aug. 6, 1962     2 Sheets—Sheet 2
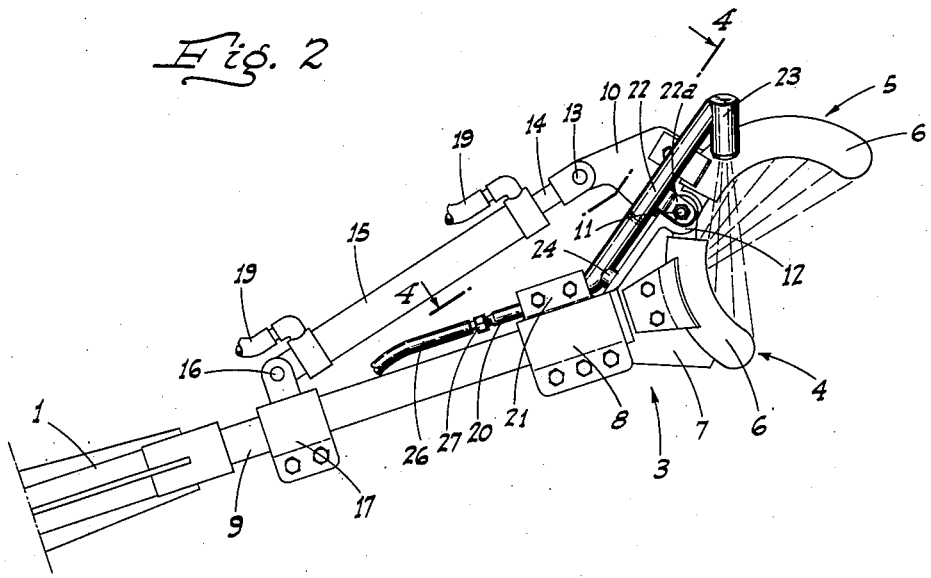
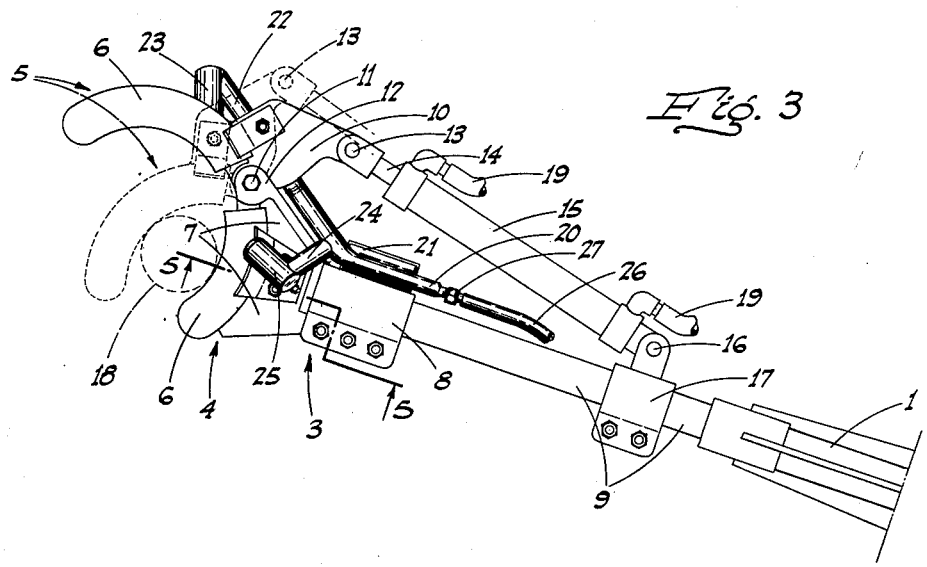

United States Patent Office 3,123,965
Patented Mar. 10, 1964

3,123,965
LIQUID LUBRICANT APPLYING DEVICE FOR A TREE SHAKER GRAPPLE UNIT
Frederick L. McEwen, 3729 S. McDonough Ave., Sanger, Calif.
Filed Aug. 6, 1962, Ser. No. 214,905
4 Claims. (Cl. 56—328)

This invention relates in general to an improvement in power actuated limb shaking apparatus, known as "tree shakers," and as employed during harvest to free fruit or nuts from tree limbs by imparting relatively high frequency vibration to the latter.

Such type of apparatus conventionally includes an elongated, forwardly and upwardly inclined, tractor-mounted boom fitted on its outer end with a grapple unit adapted for tree limb engagement; the grapple unit being reciprocably mounted on the boom, and power means, actuated from the tractor, being employed to impart rapid reciprocation to such grapple unit when in tree limb engagement.

The grapple unit includes opposed jaws relatively movable, by other power means, between an open position for placement over a limb and a closed position for pincer-like engagement about the limb. While such jaws are rubber covered for cushioning effect, they nevertheless tend—when the grapple unit is engaged about a limb, and in operation—to produce a frictional drag, and attendant heat rise, on the limb at the point of engagement. This frequently results in undesirable injury to the limb, as by friction burning, bruising, or skinning.

It is therefore the major object of this invention to provide, in combination with a grapple unit as above, a novel device for applying a liquid lubricant to the rubber covered jaws, as well as to the limb at the point of engagement, whereby to minimize such frictional drag and to thereby effectively prevent the undesirable friction burning, bruising, or skinning of the engaged limb.

Another object of the invention is to provide a device, as in the preceding paragraph, which includes a novel liquid lubricant spraying nozzle assembly mounted in association with the grapple unit; the liquid lubricant being fed to such nozzle assembly from a supply tank on the tractor, and which feeding of the liquid lubricant is under the control of the tractor operator.

A further object of the invention is to provide a practical, reliable, and durable liquid lubricant applying device for a tree shaker grapple unit.

These objects are accomplished by means of such structure and relative arrangement of parts as will fully appear by a perusal of the following specification and claims.

In the drawings:

FIG. 1 is a somewhat diagrammatic elevation of a tractor-mounted tree shaking apparatus embodying the present invention.

FIG. 2 is an enlarged fragmentary elevation showing particularly the grapple unit and the nozzle assembly as mounted in association therewith; the upper jaw being shown in its open position.

FIG. 3 is a similar view, but is taken from the opposite side of the grapple unit; the upper jaw being shown in full lines in open position, and in dotted lines in closed position.

FIG. 4 is a top plan view showing particularly the nozzle assembly; the view being taken on line 4—4 of FIG. 2.

FIG. 5 is a fragmentary sectional bottom plan view taken on line 5—5 of FIG. 3.

Referring now more particularly to the drawings, and to the characters of reference marked thereon, the present invention is embodied in a tree limb shaking apparatus (or "tree shaker") which includes an elongated, forwardly extending, normally upwardly inclined boom 1 mounted at its lower end in connection with and projecting ahead of a tractor 2.

At its outer end the boom 1 is fitted with an initially open grapple unit, indicated generally at 3; such grapple unit including, in substantially facing or opposed relation, a curved, fixed lower jaw 4 and a curved, movable upper jaw 5. Each such jaw is provided with an exterior resilient covering or sleeve, preferably of rubber; each such sleeve being indicated at 6.

The fixed lower jaw 4 is carried in rigid relation on the outer end of a substantially triangular attachment plate 7 rigidly secured to the outer end of a clamp 8. The clamp 8 is mounted on the outer end of a longitudinally extending shaker rod 9 which slidably extends through the boom 1 and thence projects to a termination a distance beyond the upper end of the latter. The shaker rod 9 is adapted to be rapidly reciprocated from suitable mechanism (not shown) on the tractor 2.

The movable upper jaw 5 is carried in rigid relation on the forward or outer end portion of a swingable attachment plate 10 formed in the nature of a bellcrank and pivotally mounted by a bolt, as at 11, in connection with a clevis 12 at the upper end of the fixed attachment plate 7. At its rear end the swingable attachment plate 10 is pivotally connected, as at 13, to the forward end of the piston rod 14 of a double-acting, longitudinal power cylinder 15 which lies above the projecting portion of the shaker rod 9; the rear end of such power cylinder 15 being pivotally connected, as at 16, to a clamp 17 on said projecting portion of the shaker rod 9 in spaced relation rearwardly of the clamp 8.

Upon retraction of the power cylinder 15 the grapple unit 3 is opened, with the jaws 4 and 5 spread relatively widely apart, and upon extension of said power cylinder the grapple unit 3 is closed, with the upper jaw 5 swung downwardly toward the lower jaw 4, and for the purpose of gripping a tree limb 18 between said jaws. The power cylinder 15 is controlled, by the operator of the tractor 2, by means of a valved fluid pressure conduit system, shown only in part at 19.

The liquid lubricant applying device—as associated with the grapple unit, and which device embodies the present invention—comprises the following:

A relatively short pipe 20 extends longitudinally above and is secured in connection with the clamp 8 by means indicated at 21; such pipe merging in communication at its front end with a forwardly and upwardly inclined pipe leg 22 which is laterally outwardly offset at the outer portion so as to extend in clearance relation to the swingable attachment plate 10 at one side of the grapple unit 3. The pipe leg 22 is maintained in a fixed position by an ear 22a which projects downwardly from such pipe leg intermediate its end and is carried on the pivot bolt 11. At its upper end the pipe leg 22 is fitted in communication with and supports a downwardly discharging nozzle 23. The nozzle 23 is disposed in a position to spray the liquid lubricant onto the rubber sleeve 6 of the fixed lower jaw 4.

Immediately ahead of the pipe 20 the pipe leg 22 is formed and communicates with a relatively short lateral pipe leg 24 which projects to a point outwardly of the fixed attachment plate 7 at the opposite side of the grapple unit. At its outer end the lateral pipe leg 24 is fitted and communicates with an upwardly discharging nozzle 25. The nozzle 25 is disposed so as to spray liquid lubricant onto the rubber sleeve 6 of the movable upper jaw 5.

Liquid lubricant—preferably a water solution of liquid soap—is fed to the pipe 20, and hence simultaneously to the nozzles 23 and 25 by means of a flexible hose 26 attached to the rear end of the pipe 20 by a coupling 27. From the coupling 27 the hose 26 leads into and extends downwardly in the boom 1; there being considerable slack 28 in such flexible hose 26 between the upper end of the boom 1 and the coupling 27 so as to permit the grapple unit 3, and the described nozzle assembly thereon, to reciprocate without interference by or damage to such hose.

From the rear end portion of the boom 1 the flexible hose 26 leads to the discharge side of a pump 29, which pump is connected in turn, at the intake side, to a rear mounted, liquid lubricant supply tank 30 by means of a supply conduit 31. The pump 29 is of a manually operated type and is actuated by the tractor operator, from his seat thereon, by means of a foot pedal 32 connected to such pump, as at 33.

By working the foot pedal 32 through one or more strokes, a quantity of the liquid lubricant is fed from the tank 30 to the hose 26, and in turn to the nozzles 23 and 25.

In use of the tree limb shaking apparatus, the grapple unit 3 is initially in its open position, and before engagement with a tree limb the rubber sleeves 6 of the jaws 4 and 5 of said open grapple unit 3 are sprayed, from the nozzles 23 and 25, with the liquid lubricant.

Thereafter, the open grapple unit 3 is maneuvered until the limb 18 is received in such unit, whereupon the jaw 5 is closed relative to the jaw 4 by operation of the power cylinder 15. This closes the grapple unit 3 on the limb 18 with a relatively firm grip.

Nextly, liquid lubricant is again sprayed from the nozzles 23 and 25 onto the rubber sleeves 6 of the jaws 4 and 5, and also onto the limb 18 at the point of engagement by the grapple unit 3. The grapple unit 3 is then rapidly reciprocated through the medium of the shaker rod 9, whereby a relatively high frequency vibration is imparted to the limb to free the fruit or nuts therefrom.

By reason of the lubrication of the rubber sleeves 6 of the jaws 4 and 5, as well as the lubrication of the limb 18 at the point of engagement, friction drag between said rubber sleeves and limb is reduced to a minimum, with the result that there is effective prevention of friction burning, bruising, or skinning of the limb, and as heretofore occurred when the grapple unit was employed without the benefit of the present liquid lubricant applying device.

As heretofore indicated, the liquid lubricant is preferably a water solution of liquid soap, although other types of soluble lubricants may be used.

Also, it is contemplated that the solution may include a dye material to mark each limb as shaken, whereby to identify it as one that has already been shaken and to preclude inadvertent repetition of the operation.

It is further contemplated that the solution may additionally include a dissolved quantity of a material, such as that known as "Tree Seal," for the purpose of providing a healing effect on any small abrasions that may occur on the limb. Such material—depending on its characteristics—may also possibly serve to provide the desired marking of the limb as shaken.

While the lubricant solution does—because of its antifriction characteristic—reduce the heat of friction between the rubber sleeves 6 and the engaged limb, further benefit is obtained by applying such a solution at a relatively low temperature. To this end a solution refrigerating unit (not shown) may be interposed in the solution conduit system at any desirable point in its length.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A liquid lubricant applying device for the grapple unit of a tree shaker, said unit including cooperating upper and lower jaws adapted to grip a tree limb, a rigid support for the jaws, and means to open and close the jaws; said device comprising a pipe leg on each side of the support, a nozzle on the outer end of each pipe leg clear of the jaws, one nozzle being positioned to discharge liquid lubricant upwardly and laterally onto the upper jaw, and the other nozzle being positioned to discharge liquid lubricant downwardly and laterally onto the lower jaw, and means to feed a lubricant to the pipe legs and nozzles simultaneously.

2. A liquid lubricant applying device for the grapple unit of a tree shaker, said unit including cooperating upper and lower jaws adapted to grip a tree limb, a pair of nozzles, means mounting one nozzle on the unit laterally out from and below the upper jaw in position to direct a spray of lubricant upwardly and laterally against the upper jaw, means mounting the other nozzle on the unit laterally out from and above the lower jaw on the side of the unit opposite the one nozzle in position to direct a spray of lubricant downwardly and laterally against the lower jaw, and means to feed a liquid lubricant under pressure to the nozzles.

3. In combination, a tractor, a boom mounted on and projecting from the tractor, a grappling unit on the upper end of the boom and including tree-limb engaging jaws; a nozzle mounted on the unit in position to spray one of the jaws, a lubricant spray tank mounted on the tractor, a pump mounted on the tractor and receiving lubricant from the tank, a conduit extending from the pump to the nozzle, and pump actuating means including a manually operable element positioned for manipulation by the driver of the tractor.

4. In a tree shaker which includes a grapple unit having cooperating jaws operative to grip a tree limb, means rigidly fixed on the grapple unit positioned and adapted to apply a liquid lubricant to the jaws, and means to feed such lubricant to said applying means; the tree shaker embodying a boom, a reciprocatory shaker rod projecting from the outer end of the boom, the grapple unit being mounted on the projecting portion of such rod, and said liquid lubricant feeding means including a flexible conduit extending in part and slack between the outer end of the boom and said liquid lubricant applying means.

References Cited in the file of this patent

UNITED STATES PATENTS

| | | |
|---|---|---|
| 1,056,046 | Myers | Mar. 18, 1913 |
| 1,756,129 | Nishinaka | Apr. 29, 1930 |
| 2,685,773 | Dauenhauer | Aug. 10, 1954 |
| 2,707,008 | Bannister | Apr. 26, 1955 |
| 2,747,330 | Simpkins | May 29, 1956 |
| 2,929,184 | Lamouria | Mar. 22, 1960 |
| 3,006,130 | Jones | Oct. 31, 1961 |
| 3,013,374 | Balsbaugh | Dec. 19, 1961 |
| 3,041,811 | Sides | July 3, 1962 |